United States Patent [19]

Kulp

[11] Patent Number: 4,803,474
[45] Date of Patent: Feb. 7, 1989

[54] CURSOR CONTROL MATRIX FOR COMPUTER GRAPHICS

[75] Inventor: George R. Kulp, Hatfield, Pa.

[73] Assignee: Fischer & Porter Company, Warminster, Pa.

[21] Appl. No.: 840,941

[22] Filed: Mar. 18, 1986

[51] Int. Cl.$^4$ ............................................. G09G 3/02
[52] U.S. Cl. ................................. 340/709; 340/711; 364/189
[58] Field of Search ............... 340/709, 711, 705, 712; 364/188, 189

[56] References Cited

U.S. PATENT DOCUMENTS

| | | | |
|---|---|---|---|
| 3,731,299 | 5/1973 | Bouchard et al. | 340/711 |
| 4,085,443 | 4/1978 | Dubois et al. | 340/711 |
| 4,476,462 | 10/1984 | Feldman | 340/709 |
| 4,698,625 | 10/1987 | McCaskill et al. | 340/709 |

OTHER PUBLICATIONS

"Microprocessor-Controlled Cursors" by Judd and Murphy, IBM Tech. Discl. Bulletin, vol. 22, No. 5, Oct. 1979.

"Diagonal Cursor Move Keys" by Troan, IBM Tech. Discl. Bulletin, vol. 26, No. 3A, Aug. 1983.

Primary Examiner—John W. Caldwell, Sr.
Assistant Examiner—Tyrone Queen
Attorney, Agent, or Firm—Michael Ebert

[57] ABSTRACT

Computer graphics for an industrial process installation or other computer-controlled system in which the system is graphically displayed on the screen of the computer terminal. Each controllable element in the system, such as a valve, a control dial or a switch, is marked on the display by an action point. In order for an operator to select any desired action point on the display to carry out an action appropriate thereto, a cursor is provided which can be manipulated by a key matrix to occupy a position coinciding with any action point thereon. The key matrix is a three-by-three-matrix constituted by a home key surrounded by eighty arrow keys whose arrows are directed to the major axes of a compass rose. Only one action point can be selected at a time. The selected point then effectively becomes the compass center, the previously selected point being then deselected. To select a new action point from among the various points dispersed on the display, the arrow key which most closely points in the compass direction of the desired action point is pressed, and the cursor then jumps one step from the home point to the newly-selected point. If, however, more than one action point lies along a given compass axis extending between the home point and the desired point, the operator must then repeatedly press the arrow key for that direction to cause the cursor to jump one step at a time from point to point until the cursor rests at the desired action point.

3 Claims, 3 Drawing Sheets

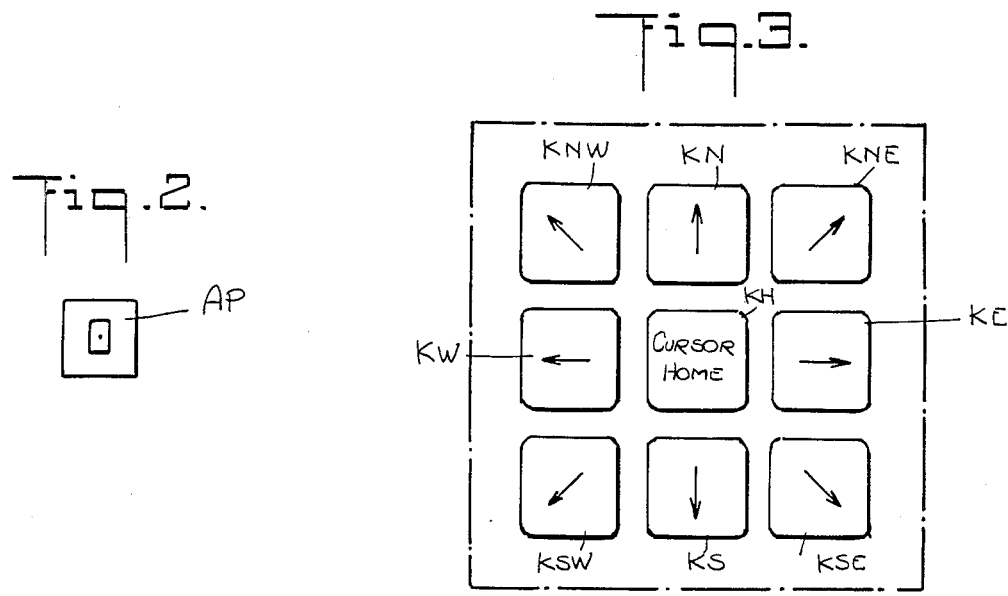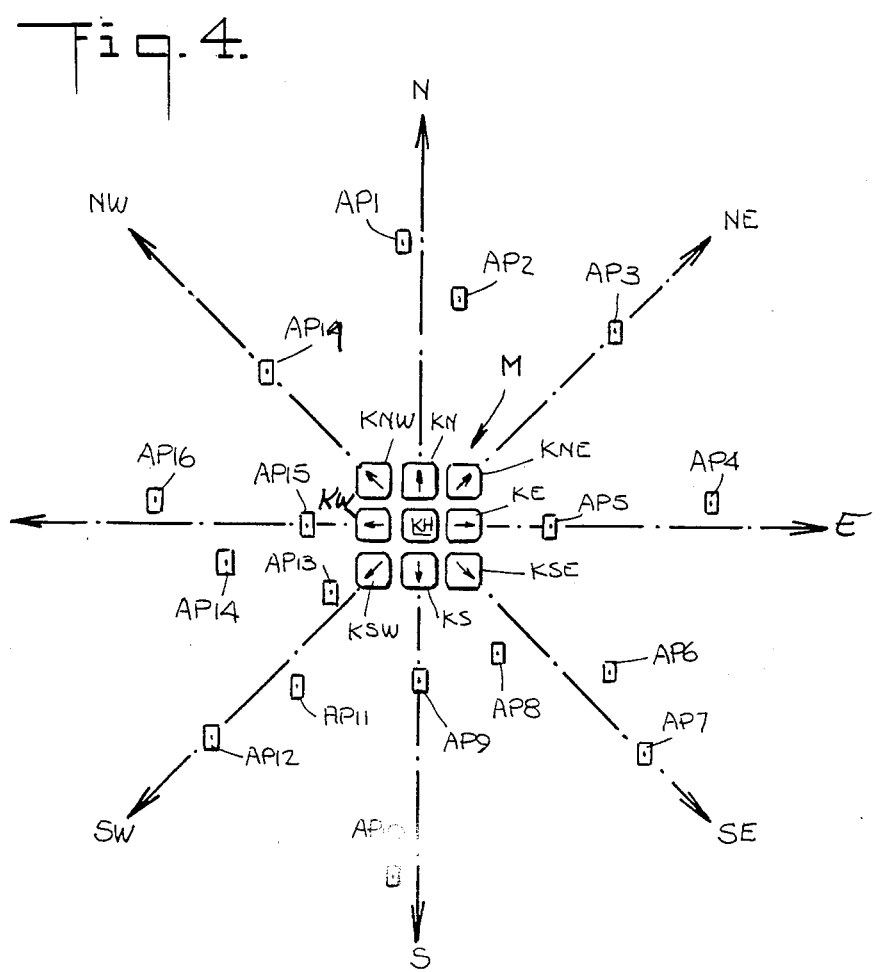

CURSOR CONTROL MATRIX FOR COMPUTER GRAPHICS

BACKGROUND OF INVENTION

1. Field of Invention

This invention relates generally to computer graphics, and in particular to a key matrix making it possible for an operator who views a computer terminal graphics display to manipulate a cursor to occupy selected action points thereon.

2. Status of Prior Art

Involved in computer graphics is communication between an operator and a computer wherein the input and output of the computer takes the form of charts, drawings or pictorial representations. Thus computer graphics may be a line drawing of a two or three dimensional abstraction, the structural component of a building or a flow chart.

In an industrial process control system, the several process variables to be controlled, such as flow rate, pressure and temperature are sensed by individual transducers each included in a local process loop. In direct digital control, the several local control loops of a given installation are governed by a computer having a CRT display terminal on which one may graphically display the process being controlled and alphanumeric data relating thereto.

Thus in a chemical processing plant in which say a process is carried out in a reactor into which is fed through respective control valves various chemicals and catalysts as well as steam under pressure derived from a steam generator, among the process variables are the flowrates of the inflowing chemicals into the reactor, the timing of the reaction, the level of temperature within the reactor, the flowrate of the product discharged from the reactor as well as the steam pressure. In a computer-controlled system, a schematic or flow chart of the reactor process is graphically presented on the cathode ray tube terminal before which is an operator console making it possible for the operator to single out any process varaable on the display and to exercise control thereover.

In order for an operator to select any process variable in a computer graphics display, the use of a cursor for this purpose is often employed. A cursor is a symbol or special character serving as a pointer to allow interaction between the console operator and the display. It may take the form of a blinking luminous dot, an inverted V or caret, or any other distinctive symbol.

Alphanumeric keyboards usually include special keys or a cursor matrix adapted to shift the position of a cursor to the left or right, or up or down, as well as a "home" key. Thus, the usual key matrix is constituted by a home key surrounded by four "arrow" keys to effect movement of the cursor away from the home position along the X or Y axis.

If, therefore, the cursor is initially at its "home" position near the upper left-hand corner of a graphics display and the operator wishes by way of the cursor matrix to select a control point on the display near its center, he cannot with the conventional cursor matrix cause the cursor to slew or move along a diagonal in the shortest path toward the control point. He can only advance the cursor first to the right in the X direction to a point above the control point and in vertical alignment therewith, and then move the cursor in the Y direction down to the control point, the operator being careful not to overshoot.

It is for this reason that on a graphics control console, the cursor symbol is usually manipulated by a manual input device such as a joystick, a data tablet, a trackball, a forcestick or a mouse. In the case of a joystick, for example, the operator can, as it were, drive the cursor around the screen to a point where it coincides with the exact X-Y location of the desired control point on the graphics display. However, the use of joysticks and other expedients in conjunction with operator keyboards adds substantially to the cost of the computer graphics and has other disadvantages, such as low speed of operation, overshoot and excessive computer processing load.

SUMMARY OF INVENTION

In view of the foregoing, the main object of this invention is to provide a key matrix for manipulating a cursor on a computer graphics display in a manner making it possible to quickly, easily and intuitively select any one of several specially-marked and pre-programmed action points regardless of the location of the action point of interest on the display and no matter what action point is currently selected.

More particularly, an object of this invention is to provide a computer graphics display for an industrial process installation or other system in which each sanctioned activity, such as a valve or control knob adjustment, or a switch operation, is marked on the display by a distinct action point, whereby before a sanctioned activity can be carried out the action point associated therewith must be selected by the cursor.

A significant feature of the invention is that instead of using traditional means such as a joystick on a graphics console for slewing the cursor to shift it from its home position to a selected action point, use is made of an arrow key matrix to cause the cursor to jump one step at a time from action point to action point on the display so that the cursor can only be brought to rest on an action point of interest and not permitted to occupy any other position in the display, thereby expediting the selection of a desired action point.

Briefly stated, these objects are attained in computer graphics for an industrial process installation or other computer-controlled system in which the system is graphically displayed on the screen of the computer terminal. Each controllable element in the system, such as a valve, a control dial or a switch, is marked on the display by an action point. In order for an operator to select any desired action point on the display to carry out an action appropriate thereto, a cursor is provided which can be manipulated by a key matrix to occupy a position coinciding with any action point thereon. The key matrix is a three-by-three-matrix constituted by a home key surrounded by eight arrow keys whose arrows are directed to the major axes of a compass rose.

Only one action point can be selected at a time. The selected point then effectively becomes the compass center, the previously selected point being then deselected. To select a new action point from among the various points dispersed on the display, the arrow key which most closely points in the compass direction of the desired action point is pressed, and the cursor then jumps one step from the current point to the newly-selected point. If however more than one action point lies along a given compass axis extending between the current point and the desired point, the operator must then repreatedly press the arrow key for that direction to cause the cursor to jump one step at a time from point to point until the cursor rests at the desired action point.

OUTLINE OF DRAWINGS

For a better understanding of the invention as well as other objects and further features thereof, reference is made to the following detailed description to be read in conjunction with the accompanying drawings, wherein:

FIG. 2 is a separate view of an action point marked on the display;

FIG. 3 is a separate view of the key matrix;

FIG. 4 illustrates the relationship of the key matrix to the axes of a compass rose and to action points dispersed on a graphics display;

DESCRIPTION OF INVENTION

The Basic System

Figure 1:
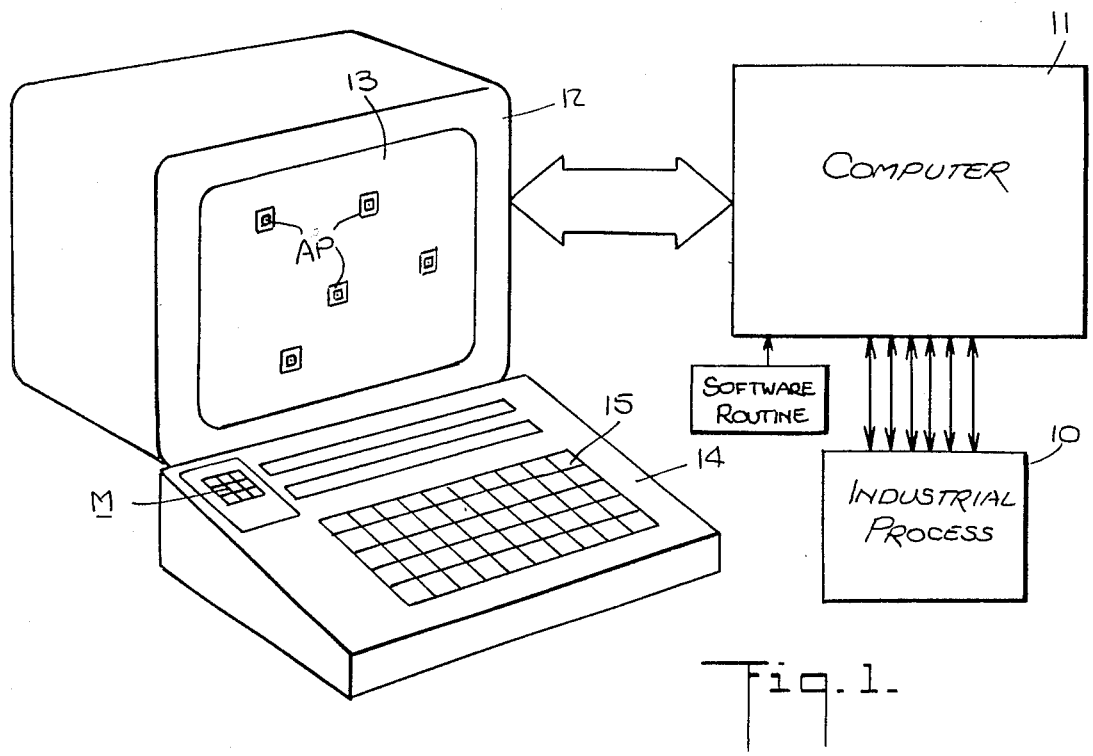
FIG. 1 shows a computer graphics terminal whose keyboard console is provided with a direction key matrix in accordance with the invention for cursor manipulation.

Referring now to FIG. 1 there is schematically illustrated an arrangement in accordance with the invention for controlling an industrial process, represented by block 10, by means of a computer 11 which is associated with a cathoderay tube terminal 12. The terminal is provided with a display screen 13 on which is graphically presented a process being controlled.

The operator who views the screen is provided with a console 14 having an alphanumeric keyboard 15 on which there is also an arrow key matrix in accordance with the invention, generally identified as matrix M. On screen 13 is a graphical representation of the process of interest (not shown in FIG. 1) each controllable element of which is marked on the screen by an action point AP, shown in enlarged form in FIG. 2. Thus, if in a given graphical presentation of a process, the controllable elements are valves, switches, pressure and temperature control knobs, each one of these is marked on the display by an action point AP adjacent the controllable element. As a consequence, the various action points are dispersed on the screen at positions determined by where their related controllable elements appear thereon.

Key matrix M, as shown in FIGS. 3 and 4 is constituted by a center or home key KH, which has no arrow, an arrow key KN pointing in the North direction, an arrow key KS pointing in the South direction, an arrow key KE pointing in the East direction, an arrow key KW pointing in the West direction and arrow keys KNE, KSE, KNW and KSW pointing respectively in the Northeast, Southeast, Northwest and Southwest compass directions, thereby covering the major directional axes of a compass rose.

Let us assume therefore in connection with FIG. 4 that the key matrix is superimposed over a graphics display having action points AP1 to AP17 disposed at various locations on the display, and that the home key KH coincides with an action point located at the geometric center of the display. In FIG. 4 the arrow keys are aligned with the major axes of a compass rose extending along the major compass directions, N, NE, E, SE, S, SW, W and NW.

Let us further assume that the cursor for this display takes the form of a blinking luminous dot so that when the cursor is caused by the key matrix to occupy a position coincident with a selected action point, that point because it blinks, is then readily distinguishable from other action points, and the operator at the keyboard can then effect computer control of the controllable element indicated thereby.

The program associated with this graphic display is such that only one action point may be selected at any one time, and when a new action point is selected, this simultaneously de-selects the previously-selected point. With the present arrangement, one cannot drive or steer the cursor along the screen in the manner of a joystick operation, but can only jump from action point to action point one step at a time in a compass direction determined by which arrow key is pressed.

Underlying the present invention is the graphical concept that no matter what action point is currently selected, the operator can imagine that the three-by-three matrix M of cursor movement keys is superimposed over the currently-selected action point which coincides with home key KH, hence arrow keys KN, KNE, etc. always indicate compass direction relative to the then selected action point. Thus, each time an arrow key is operated, the coordinate system is shifted to a new action point and remains centered thereon until the same or another arrow key is operated, causing the coordinate system to again shift.

The operating mechanism is such that after the computer display is constructed, a software subroutine is executed which examines the CRT screen for action points and enters the respective coordinates thereof into a table. A subroutine is a portion of a program that is a logically separate part thereof which performs a specific task necessary for the execution of the program. A subroutine normally represents a unique implementation of a process that is made use of frequently in a program, thereby saving programming time and storage space for codes.

During ordinary operation, each time one of the arrow keys is pressed, a software subroutine is executed which accepts as its input the currently-selected CRT screen position and one of the eight arrow key directions, and then generates as its output the next CRT screen position to be jumped to, this being effected by examining the table of coordinates for the closest entry in the designated direction.

If, therefore, one wishes in the context of the display shown in FIG. 4, to go from an action point at the geometric center of the screen to action point AP5 which is due East, one simply presses arrow key KE and the cursor will then jump to AP5 which now becomes the compass center. The operator, having selected action point AP5 which is distinguishable from all other action points by the blinking of the illuminated cursor, can now carry out at the computer keyboard whatever computer action of the control element at that action point which is appropriate thereto.

If, however, one wishes to jump the cursor from the center point on the screen to select action point AP16 which is close to, but not quite on the West direction axis, then in order to select AP16 one must first operate arrow key KW, to jump the cursor to AP15, which lies intermediate AP16 and center, and again press arrow key KW to jump from AP15 to AP16. In this instance therefore the arrow key KW must be pressed twice.

And to go from center screen to action point AP10 along compass direction S, one must operate arrow key KS twice, the first actuation causing the cursor to jump to action point AP9 which is due South, and the second action causing the cursor to jump from action point AP9 to the desired action point AP10 therebelow. If, now one wishes to go from action point AP10 which is now center to action point AP11, one operates arrow key KNW to jump from AP10 to AP11 which is Northwest thereof.

Thus, no matter what action point is currently selected, the operator always must assume that the key matrix M is superimposed thereover, with the home key KH coincident therewith, so that the arrow keys surrounding the home key always indicate compass direction relative to the currently-selected point. This is not at all difficult to do, for the currently-selected action point is occupied by the blinking cursor and is readily distinguishable for all other action points.

Computer Graphics Display

Figure 5:
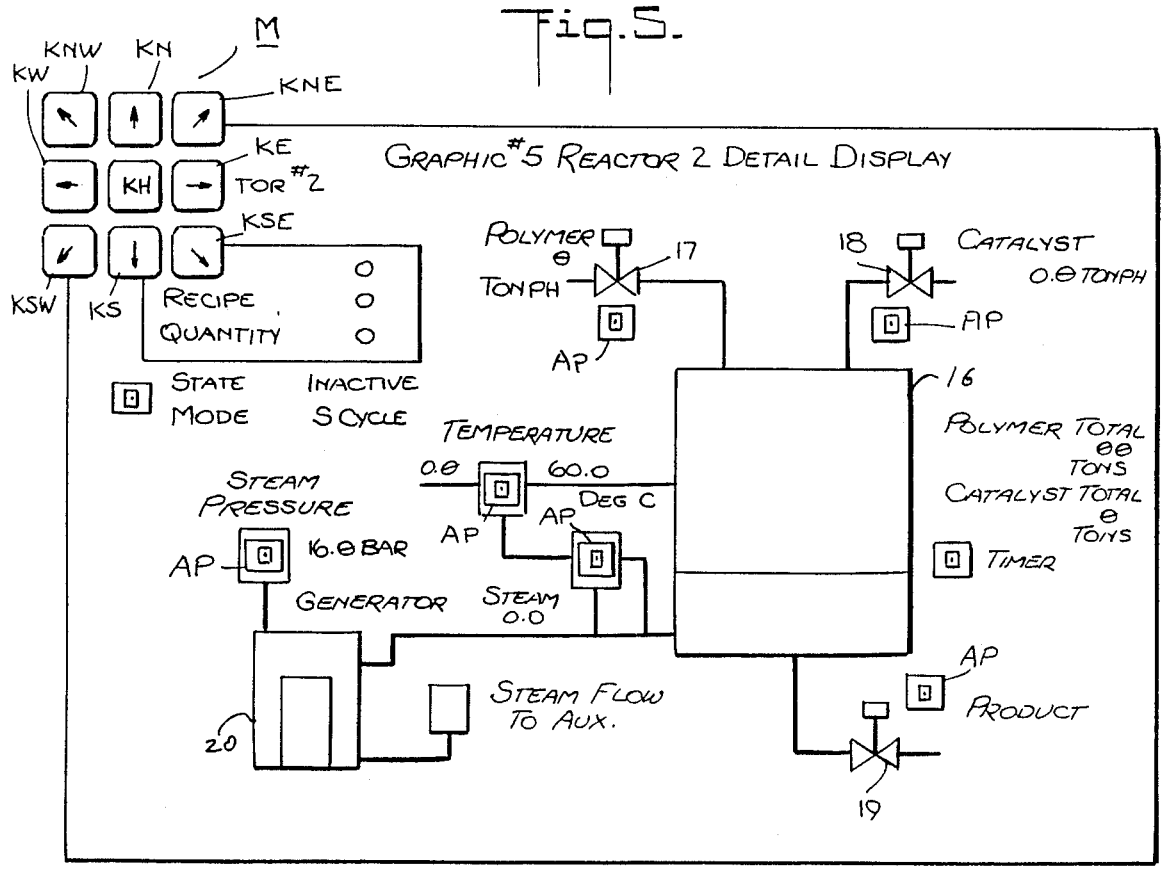
FIG. 5 is a graphics display for a particular reactor installation and the functional relationship thereto of a key matrix at the home position on the display.
Figure 6:
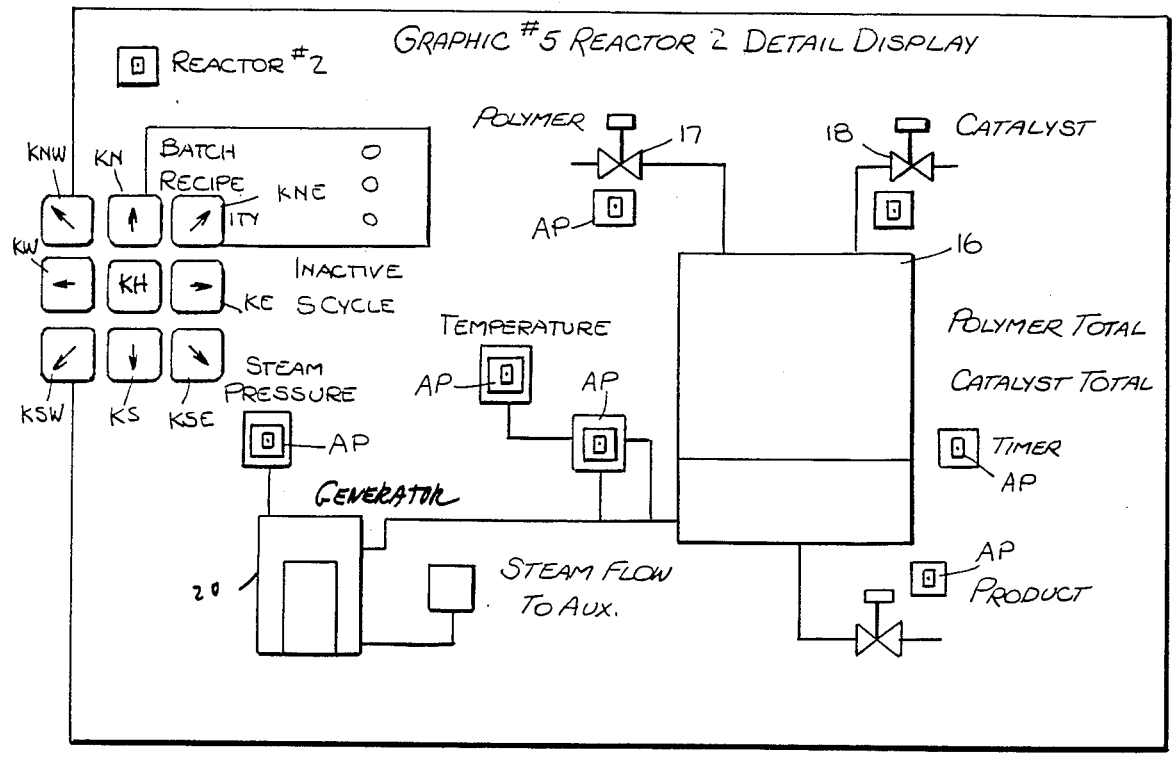
FIG. 6 is the same as FIG. 5 but at another action point.
Figure 7:
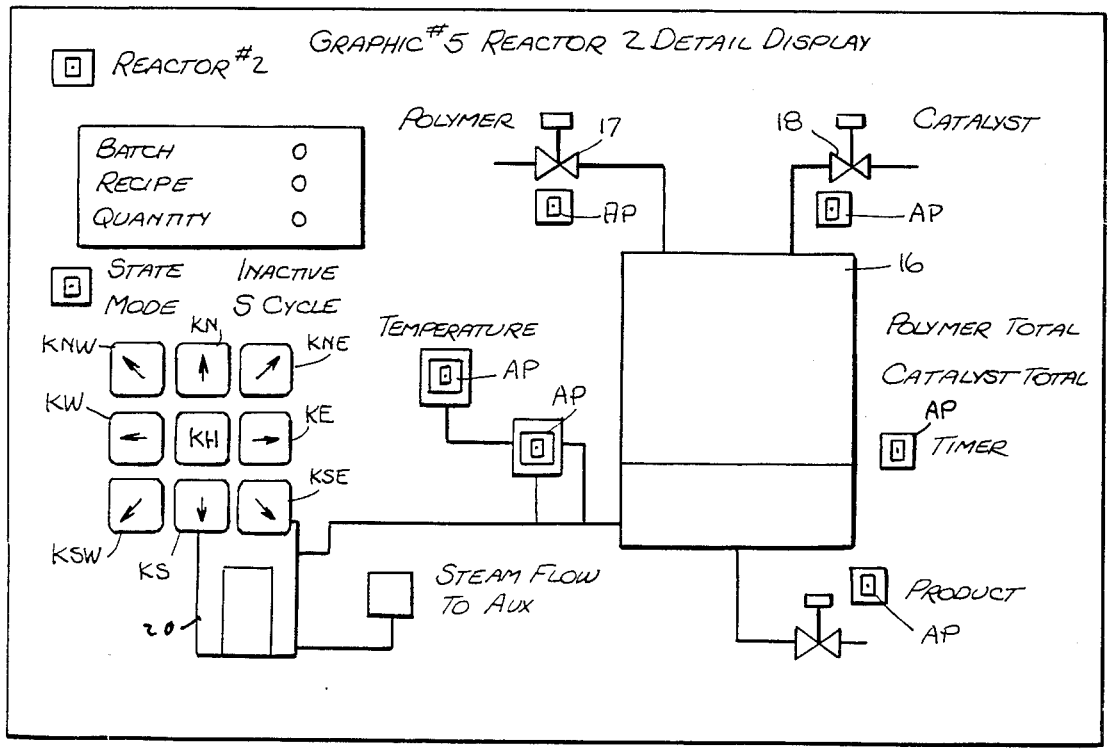
FIG. 7 is the same as FIG. 5 but at still another action point.

Let us now in conjunction with FIGS. 5, 6 and 7 consider by way of example a particular computer graphics display of an industrial process in which a chemical reactor 16 is fed with a polymer through a valve 17 and is also fed with a catalyst through a valve 18, the product produced by the reactor being discharged through a valve 19. All of these valves are represented by action points AP. Also, supplied to reactor 16 is steam from a steam generator 20. The steam pressure and temperature represent other action points AP, as does a timer for the reactor. Each action point is adjacent to the controllable element it represents.

The graphics display also includes alphanumeric data giving the prevailing steam pressure, the reactor temperature, the total amount of polymer and all other data relevant to the operation of the reactor.

In FIG. 5, key matrix M is effectively placed so that its home key coincides with home, the upper left hand corner of the display; hence, key KH is at the center of the compass. If now the operator wishes to select the action point AP marked STEAM PRESSURE, he first presses arrow key KS which causes the cursor to jump due South to the action point AP marked STATE MODE. The reason for this step is that none of the compass directions on the arrow keys point toward the STEAM PRESSURE action point AP; hence, to arrive at this point, one must do so in more than one cursor step.

When, as shown in FIG. 6, home key KH is coincident with the action point AP marked STATE MODE which is now compass center, then arrow key KSE points in the direction of action point AP marked STEAM PRESSURE, and to cause the cursor to jump to this action point one has only to press key KSE and the key matrix M now becomes superimposed over the selected action point, as shown in FIG. 7. If now one wishes to jump the cursor to the action point AP associated with the POLYMER control valve, then pressing arrow key KNE will cause this jump.

Thus, the cursor is capable of stopping only at the points of interest labelled action points and to do so not only in right angle coordinate paths, but also in angular paths along the major axes of a compass rose.

While there has been shown and described a preferred embodiment of a cursor control matrix for computer graphics in accordance with the invention, various changes may be made therein that lie within the spirit of the invention. Thus, the arrow keys of the matrix may be in a circular formation rather than in a square formation to simulate a compass rose.

I claim:

1. A computer-controlled industrial process control system provided with a plurality of controllable elements each constituted by adjustable means such as a valve, a switch or a control knob and having a computer terminal providing on a screen a graphics display of the system being controlled, each of said controllable elements being represented on the display by an action point whereby a plurality of such action points are dispersed at various positions on the display, and an arrangement making it possible for an operator viewing the screen to select any action point thereon regardless of its position so as to carry out, with the controllable element related thereto, an action appropriate to the selected point; said arrangement comprising:

A. a cursor movable on the display to provide a distinctive symbol thereon;

B. a key matrix manipulatable by the operator to cause the cursor to occupy a position coinciding with any action point on the display, said matrix being constituted by a center key representing home surrounded by eight keys, each having an arrow thereon, the respective arrows on the eight keys being directed to the major axes of a compass rose;

C. means to interlink the key matrix with the cursor to render the center key effectively coincident with a currently selected action point on the display which is then the center of the compass rose, whereby the operator, in order to select a new action point then presses the arrow key which most closely points in the compass rose direction of the desired new action point to cause the cursor to jump one step to the newly selected action point; but if more than one action point lies between the currently selected point and the desired point, the operator must then repeatedly press said arrow key to cause the cursor to jump one step at a time until the cursor rests on the desired action point, said means being constituted by a software routine in which each action point and its coordinates on the screen are entered into a table, whereby each time one of the arrow keys is pressed, a software routine is executed which accepts as its input the currently-selected screen position and one of the eight arrow key directions, and then generates as its output the next screen position to be jumped to, this jump being effected by examining the table of coordinates for the closest entry in the designated direction; and D. an alphanumeric keyboard associated with said computer adjacent to said key matrix whereby the operator may control the selected action point from the keyboard.

2. An arrangement as set forth in claim 1, wherein said cursor is a blinking light.

3. An arrangement as set forth in claim 1, wherein said key matrix is in a three-by-three key format.

* * * * *